United States Patent [19]

Matsuo et al.

[11] Patent Number: 5,082,166

[45] Date of Patent: Jan. 21, 1992

[54] CONNECTOR BEAM JOINING METHOD

[75] Inventors: Hideshige Matsuo, Kitakyushu; Isamu Yamamoto, Kitakyushu; Michio Itoh, Kitakyushu; Kuniaki Sato, Hiratsuka; Yoshihiro Nakamura, Tama; Akia Tomita, Tokyo; Yoshiki Mihara, Tokyo, all of Japan

[73] Assignee: Hitachi Metals, Ltd., Tokyo, Japan

[21] Appl. No.: 632,592

[22] Filed: Dec. 21, 1990

Related U.S. Application Data

[63] Continuation of Ser. No. 508,245, Apr. 11, 1990, abandoned, which is a continuation of Ser. No. 266,564, Nov. 3, 1988, abandoned.

[30] Foreign Application Priority Data

Nov. 17, 1987 [JP] Japan ................... 62-175720
Feb. 12, 1988 [JP] Japan ................... 63-30535

[51] Int. Cl.⁵ ............................................. B23K 31/02
[52] U.S. Cl. .................... 228/189; 228/169; 228/173.4; 228/216; 228/50
[58] Field of Search ............... 228/173.4, 189, 216, 228/169, 50; 52/721, 729, 733; 164/229; 29/155 R, 155 C

[56] References Cited

U.S. PATENT DOCUMENTS

| 2,018,675 | 10/1935 | Hyde | 164/229 |
| 3,505,727 | 2/1967 | Johnson | 228/189 |
| 4,091,594 | 5/1978 | Yamashita | 52/721 |
| 4,125,217 | 11/1978 | Sato | 29/155 C |

FOREIGN PATENT DOCUMENTS

| 32066 | 10/1973 | Japan | 228/189 |
| 915970 | 3/1982 | U.S.S.R. | 52/721 |

OTHER PUBLICATIONS

Metals Handbook, Ninth Edition, vol. 6, pp. 68, 91, 92 and 856-892, copyright 1983.

*Primary Examiner*—Samuel M. Heinrich
*Attorney, Agent, or Firm*—McGlew & Tuttle

[57] ABSTRACT

A connector/beam joining method for joining a beam and a connector having a base plate and a projection, both formed into a T-shape in cross-section, in which the edge of a welding groove provided on the end of the projection of the connector is matched with the edge of the inside surface of a flange constituting the beam for positioning, and a backing strip formed into a prescribed length is fixedly fitted by welding so as to come in close contact with the end surface of the projection and the inside surface of the flange.

3 Claims, 6 Drawing Sheets

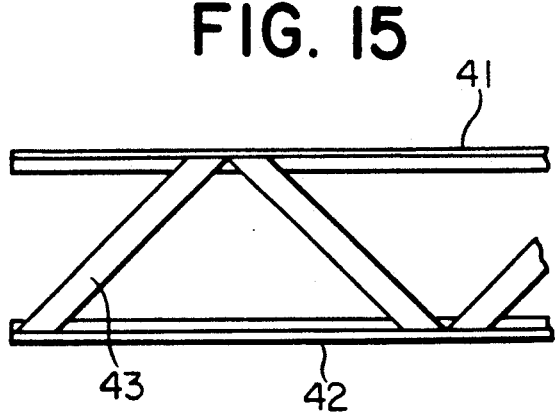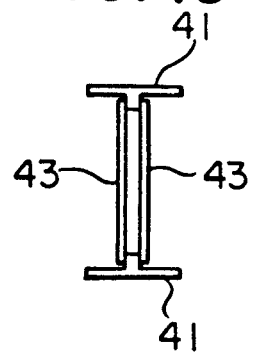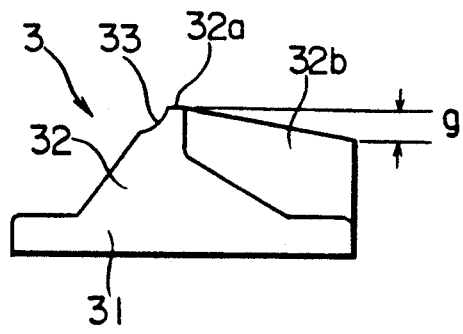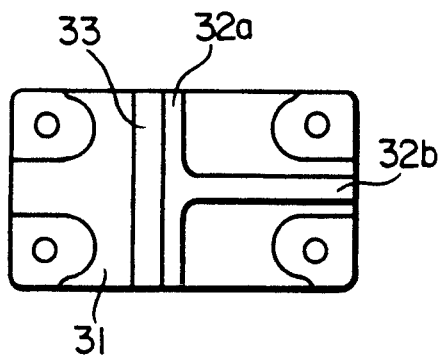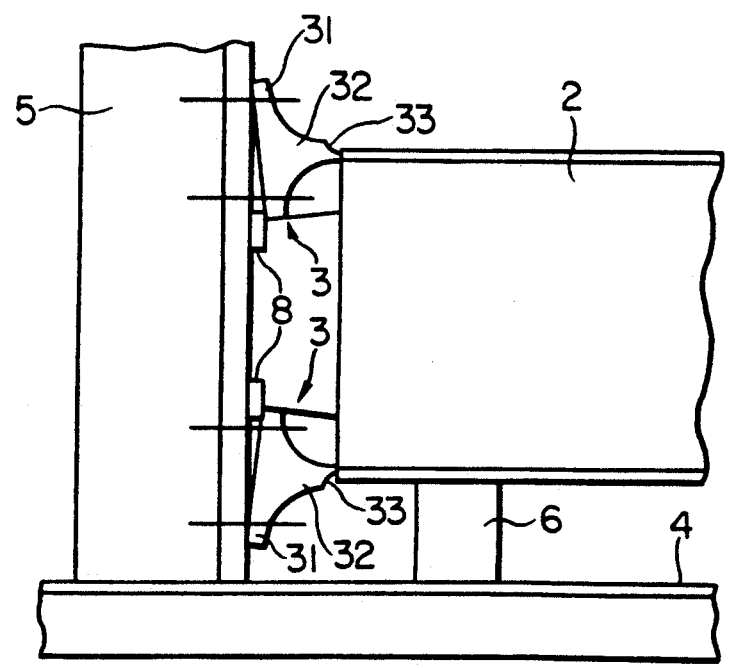

CONNECTOR BEAM JOINING METHOD

This is a file wrapper continuation application of application Ser. No. 508,245 filed Apr. 11, 1990 now abandoned, which is a continuation application of application Ser. No. 266,564, filed Nov. 3, 1988, now abandoned.

BACKGROUND OF THE INVENTION

This invention relates to a connector/beam joining method for use in joining a column and a beam in a steel-frame construction or a steel-frame/reinforced-concrete construction, and a combination construction of both, in which the beam is joined to a connector having a base plate and a projection, both formed into a T-shape.

DESCRIPTION OF PRIOR ART

Conventional column/beam joining method include (a) the in-situ welding type (FIG. 1), (b) the bracket connecting type (FIG. 2), (c) the split-T connecting type (FIG. 3), etc. FIG. 1 shows an example where a connector 2c is fastened in advance to an end of the web 2b of a beam 2 with rivets or other fasteners 2d, and a column 1 is joined to the beam 2 in-situ by welding. FIG. 2 shows another example where a bracket 1c is welded in advance to a column 1, and the bracket 1c is joined to a beam 2 via a connecting plate 2e and connecting bolts and nuts 2f. FIG. 3 shows still another example where a connector 2g which is fastened in advance to an end of a beam 2 via a fastener is joined to a column 1 via fasteners 2d. Among these methods, (a) has problems in the soundness of the weld zone between the column 1 and the beam 2 and the dimensional stability of the finished product, while (c) has short-comings in considerable manhours involved, poor joining efficiency and others.

To overcome the abovementioned shortcomings, a method of interposing a connector 3 between the column 1 and the beam 2 has been disclosed in Japanese Patent Publication No. 38734/1982, etc. The connector 3 in this method consists of a base plate 31 and a projection formed into a T-shape in cross-section, in conjunction with the base plate 31. A groove 33 is provided on the projection 32 facing the flange 2a of the beam 2 so that the projection 32 can be directly welded to the flange 2a of the beam 2. Numeral 4 refers to a connecting bolt.

FIGS. 5 through 7 are enlarged views of the essential part of the joint portion to illustrate the joining sequence. Like parts are indicated by like reference numerals in FIG. 4 above. In this example, the connector 3 and the beam 2 are joined together by placing both in position on a flat surface, like a surface board, and joined together by tack welding or spot welding. Then, the beam 2 is transported to the final welding site by a crane, etc., and the projection 32 of the connector 3 is joined to any one side of the web 2b of the beam 2 by fillet welding while keeping that surface of the web 2b upside, then similar fillet welding is performed by turning to the opposite side of the web 2b. Next, the flange 2a and the projection 32 are welded together while keeping the flange 2a upside, as shown in FIG. 5 to deposit weld metal 36 on the groove 33. At this time, an uneven reverse-side weld bead 37 is produced in the vicinity of the inside surface of the flange 2a. Upon completion of welding of any one flange 2a and the projection 32, the beam is turned upside down to allow the other flange (not shown) to be faced upward, and similar welding is performed. At this time, the flange 2a which has already been welded is in the state where inside surface thereof is turned upward, as shown in FIG. 6, so the aforementioned reverse-side weld bead 37 is also faced upward. If fillet welding is performed in the presence of the reverse-side weld bead 37, the boundary part with the weld metal 36 could fail to melt, causing defects due to incomplete penetration. To overcome such defects, a slight recess 38 is formed by removing the reverse-side bead 37 by gouging or chipping so as to deposit a buildup 39 on the recess 38, as shown in FIG. 7. Upon completion of the welding of the abovementioned one flange 2a, the beam 2 is turned upside down again to remove the reverse-side weld bead from the other flange 2a (not shown) and deposit a buildup on the recess thus formed.

The conventional method of joining the connector 3 and the beam 2, as described above, has the following problems.

(1) Upon completion of the butt welding of the flange 2a and the projection 32, it is necessary to perform fillet welding from the reverse side. Fillet welding performed in the as-butt-welded state could cause defects due to incomplete penetration in the boundary portions resulting from the uneven reverse-side weld bead 37 and other causes.

(2) It is therefore necessary to perform post-treatment operations after the butt welding, including the removal of the reverse-side weld bead 37 and gouging or chipping operation to remove irregularities on the buildup.

(3) In order to perform the gouging operation mentioned in (2) above, tooling and other auxiliary operations are required. In addition, the beam 2 has to be repeatedly turned to turn the weld surface upside. All this is quite troublesome and inefficient.

In assembling a building structure in which the column 1 and the base plate 31 of the connector 3 are joined together over the entire contact surface thereof, as described above, not only the straightness of the column but also accuracy in the length of the beam 2, that is, fabricating accuracy in joining the connector 3 and the beam 2 are of critical importance. FIG. 8 is a front view of the essential part illustrating the state where the conventional connector 3 and the beam 2 are joined together. In the figure, numeral 4 refers to a rack, on an end of which a tack-welding jig 5 is mounted to position the connector 3. In order to join the connector 3 and the beam together, the connector 3 is secured in place on the tack-welding jig 5 with bolts and nuts (not shown), the beam 2 is placed on the rack 4, and the end face of the beam 2 is brought in contact with the end face of the projection 32 of the connector 3. In this state, the flange 2a of the beam 2 and the projection 32 of the connector 3 are welded together. As shown in FIG. 9, a deformation in the direction shown by an arrow takes place due to the shrinkage of the weld metal 7 formed on the weld zone. As a result, the bottom surface of the base plate 31 of the connector 3 (see FIG. 8) becomes unwantedly convex toward the outside over the entire surface thereof. If the base plate thus deformed is joined to the column 1, the bottom surface of the base plate 31 of the connector 3 would not come in close contact with the flange 1a of the column 1, resulting in incomplete joining. If they are forcibly brought into close contact with each other by means of connecting bolts 4, an unwanted tension could act on the weld metal 7 formed on the weld zone shown in FIG. 9.

To eliminate such inconveniences, a spacer 8, made of a steel sheet, is interposed between the tack-welding jig 5 and the connector 3 to allow for the deformation of the weld zone so that the overall bottom surface of the base plate 31 forms a flat plane after welding. Another means to eliminate the inconveniences is the use of a strong restraint jig 9, as shown in FIG. 11. That is, in positioning the connector 3 using the tack-welding jig 5 shown in FIG. 8, only tack welding or spot welding is performed, and the connector 3 and the beam 2 are joined together at the time of final welding in the state where the connector 3 is fastened to the restraint jig 9 shown in FIG. 11.

The abovementioned conventional joining techniques have the following problems.

(1) Since the use of the spacer 8 produces a gap between the projection 32 of the connector 3 and the web 2b of the beam 2, an additional welding operation to fill the gap is required, resulting in increased welding volume, the time and manhours required for welding operations.

(2) The use of the restraint jig 9 during final welding also tends to increase the time and manhours required for welding operations.

In welding the connector 3 fastened to the tack-welding jig 5 to the beam 2, as shown in FIG. 8, marking is usually performed in advance to indicate center positions on the flange 2a and the projection 31 so as to accurately match the flange 2a of the beam 2 with the projection 31 of the connector 3. In the meantime, bolt holes (not shown) for connecting the connector 3 to the column 1 or the beam 2 are provided on the connector 3, which is usually manufactured by casting or forging. Before machining the connector 3, marking is needed to indicate the centers of bolt holes. These marking operations must be carried out on each piece of the connector 3, involving extremely troublesome and enormous time and manhours. This leads not only to increased construction costs but also to delay in the entire work schedule in some cases.

SUMMARY OF THE INVENTION

It is the first object of this invention to provide a connector/beam joining method for efficiently and safely joining a connector and a beam.

It is the second object of this invention to provide a connector/beam joining method that facilitates joining or welding operations and improves the quality of the joint.

BRIEF DESCRIPTION OF THE DRAWINGS

FIGS. 15 and 16 are a front view and a side view of the essential part illustrating another example of the beam with which this invention is concerned.

FIGS. 17 and 18 are a front view and a plan view of a connector used in a second embodiment of this invention.

FIG. 19 is a partially enlarged front view illustrating the state where the connector and the beam are joined together in the second embodiment of this invention.

DETAILED DESCRIPTION OF THE EMBODIMENTS

Figure 12:
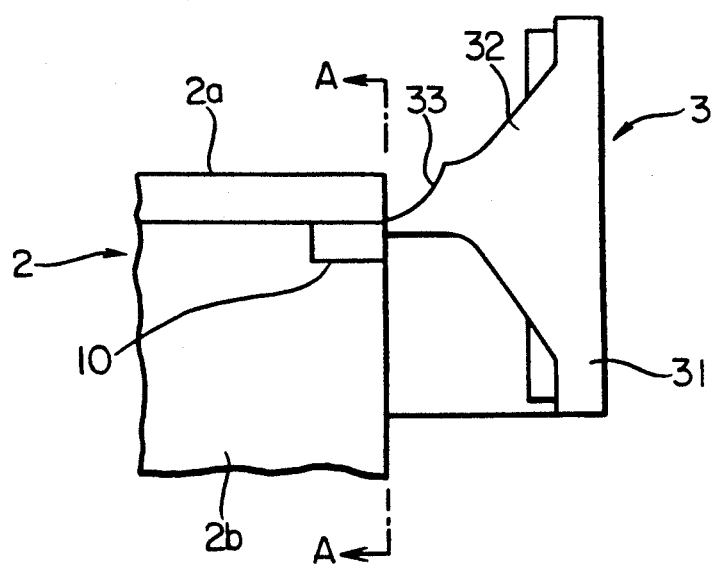
FIG. 12 is a front view of the essential part illustrating a first embodiment of this invention.
Figure 13:
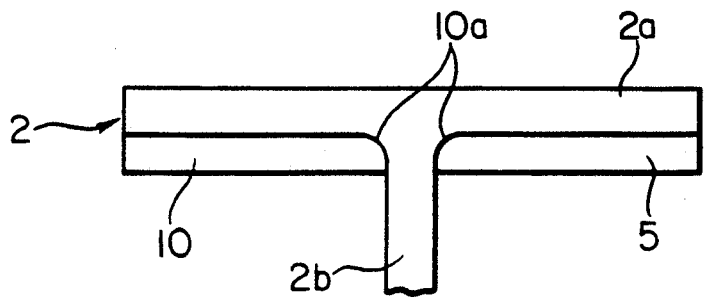
FIG. 13 is a cross-sectional view taken along line A—A shown in FIG. 12.

FIG. 12 is a front view of the essential part of a first embodiment of this invention. FIG. 13 is a cross-sectional view taken along line A—A shown in FIG. 12. Like parts are indicated by like numerals shown in FIGS. 1 through 11. In FIGS. 12 and 13, reference numeral 10 indicates a backing strip, made of the same material used for the beam 2 or the connector 3, formed into a rectangular shape, for example, in cross-section. The backing strip 10 is fixedly fitted in such a manner that one surface of the backing strip 10, including the long sides of the cross-section thereof is brought into close contact with the inside surface of the flange 2a, and the other surface of the backing strip 10 orthogonally intersecting the above-mentioned one surface makes contact with the end face of the projection 32 of the connector 3, or is made flush with the end face of the beam 2. Moreover, it is recommended that one edge of the backing strip 10 be rounded into a rounded part 10a to ensure close fit to the rounded joint part between the flange 2a and the web 2b of the beam 2, and that the length of the backing strip 10 be formed into the same or larger size than the width of the flange 2a or the connector 3, and that the backing strip 10 be fixedly fitted in advance to the inside surface of the flange 2a before the connector 3 and the beam 2 are joined together. The backing strip 10 may be joined to the inside surface of the flange 2a by spot welding, for example. The connector 3 is then positioned by matching the edge of a groove 33 provided on the end of the projection 32 of the connector 3 with the edge of the inside surface of the flange 2a, and the projection 32 and the web 2b are joined together by fillet welding.

Figure 14:
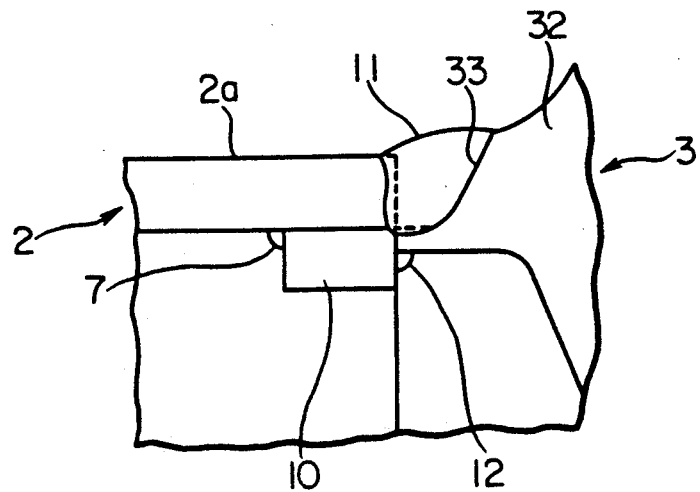
FIG. 14 is a front view of the essential part illustrating the state after joining in the first embodiment of this invention.

FIG. 14 is a front view of the essential part illustrating the state after joining in the first embodiment of this invention. Like parts are indicated by like numerals shown in FIGS. 12 and 13. After positioning as shown in FIG. 12, a weld metal 11 is deposited on the groove 33, as shown in FIG. 14. In this case, part of the flange 2a, the projection 32 and the backing strip 10 are melted and blended with the weld metal 11 to complete the joining. Numeral 12 indicates a fillet weld.

FIGS. 15 and 16 are a front view and side view of the essential part illustrating another example of the beam with which this invention is concerned. The beam shown is a latticed beam constructed by connecting and bracing two parallel flange members 41 and 42 with a plurality of lattice bars 43 in a zigzag fashion. This invention can be used in connecting this type of beam to a steel-frame column, for example.

In the above embodiment, the beam 2 is a single H-steel beam or a latticed construction having connecting members and flange members. This invention, however, can be applied to other types of latticed constructions consisting of shape steels and/or steel plates. Needless to say, this invention can be applied to a steel-frame column, made of a single H-steel beam, or of a built-up type using H-steel beams, or of a latticed construction consisting of shape steels and/or steel plates. As a means for fastening the backing strip 10 to the flange 2a, welding, adhesive-assembly, magnetic fastening, bolts and other fastening means, or a combination of them may be used. The shape and size of the backing strip 10 may not be limited to those shown in the above embodiment, but any shape and size may be used so long as the backing strip 10 can make close contact with the end face of the projection 32 of the connector 3 and the inside surface of the flange 2a. The material of the backing strip 10 may be not only any metallic material similar or close to that of the beam 2 and the connector 3 but also any other non-metallic material, such as ceramics. When using a backing strip 10 made of a non-metallic material, the backing strip 10 is removed after the connector 3 and the beam 2 are butt welded, and then fillet welding is performed from the inside surface of the flange 2a. Furthermore, a composite material, such as a metallic material coated with a ceramic material on the surface thereof, or a metallic material having corners or other portions made of a ceramic material may be used for the backing strip 10.

Figure 1:
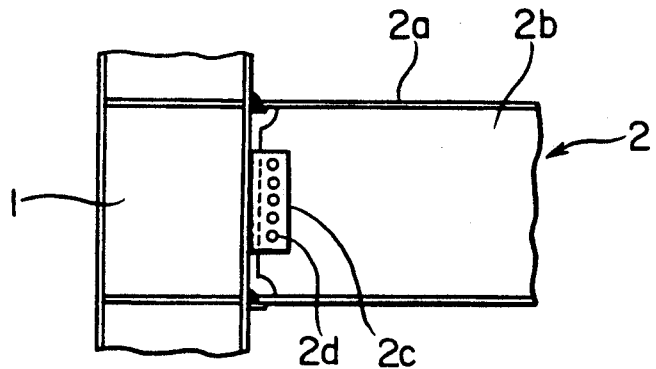
FIGS. 1 through 3 are diagrams illustrating the conventional column/beam joining methods.
Figure 2:
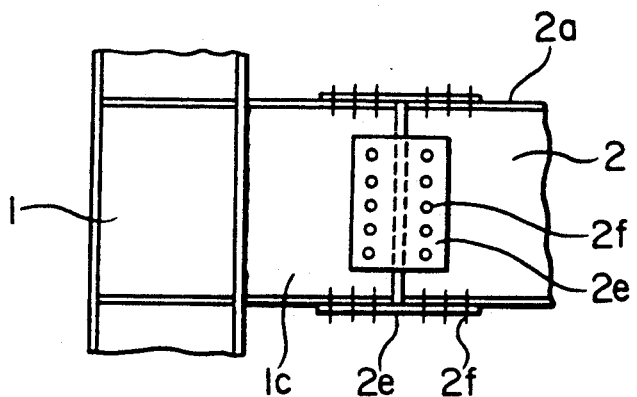
Figure 3:
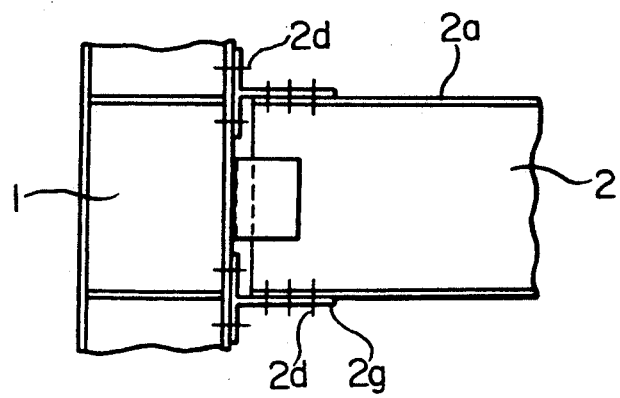
Figure 4:
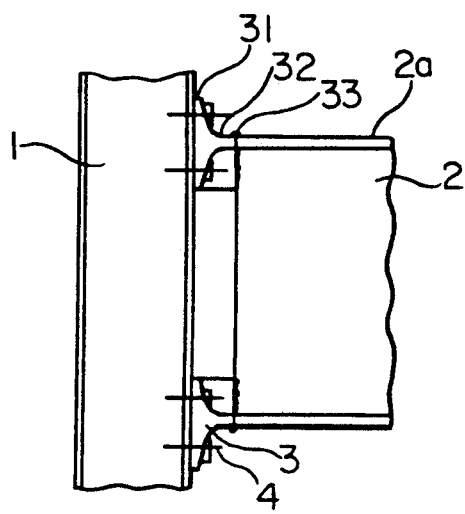
FIG. 4 is a diagram illustrating an improvement on the conventional column/beam joining method.
Figure 5:
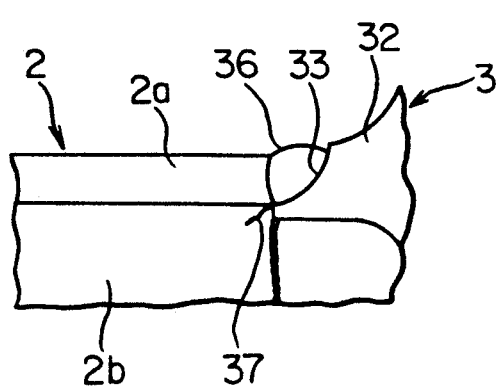
FIGS. 5 through 7 are enlarged views of the essential part of the joining method shown in FIG. 4, illustrating the sequence of joining a connector and a beam.
Figure 6:
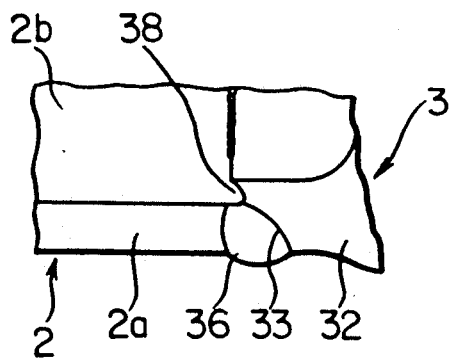
Figure 7:
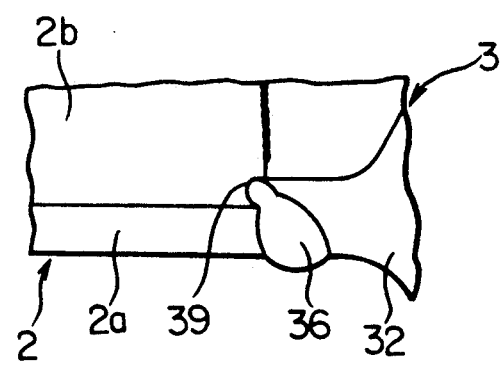
Figure 8:
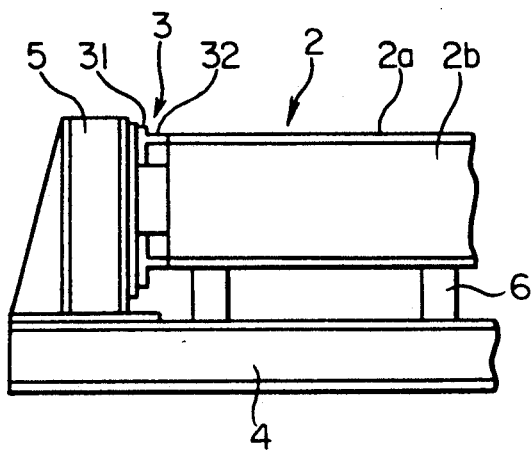
FIGS. 8 and 9 are front views of the essential part illustrating the state where a conventional connector and the beam are joined together.
Figure 9:
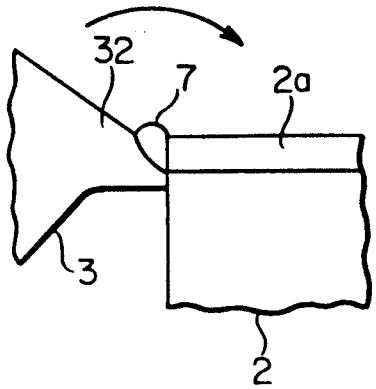
Figure 10:
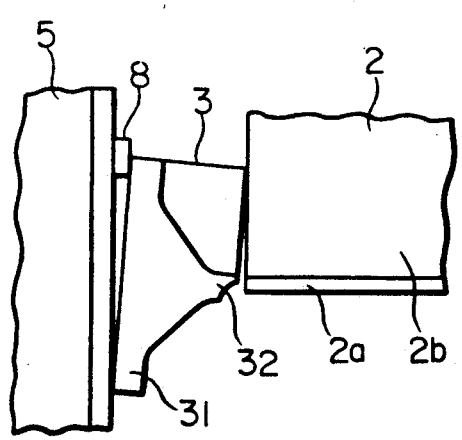
FIG. 10 is a partially enlarged front view illustrating the state of the weld zone.
Figure 11:
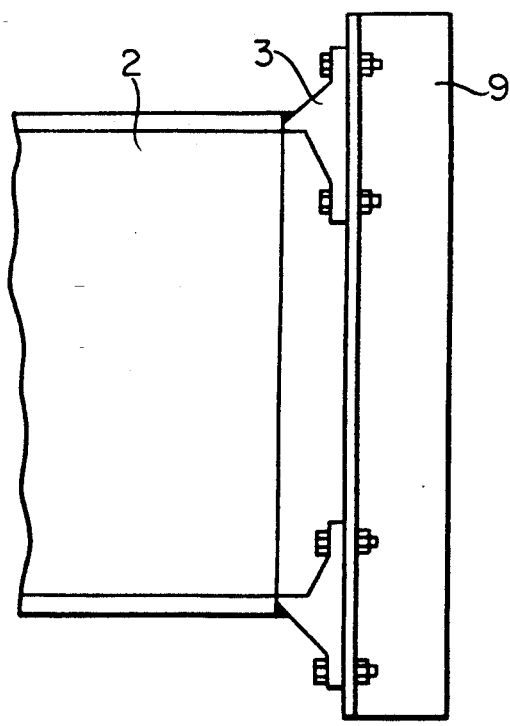
FIG. 11 is a partially enlarged front view illustrating the state where the connector and the beam are joined together using a conventional restraint jig.

FIGS. 17 and 18 are a front view and a plan view of a connector used in a second embodiment of this invention. Like parts are indicated by like numerals in FIGS. 1 through 14. In both FIGS., the projection 32 is such that the height from the base plate 31 of a protrusion part 32b facing the web 2b of the beam 2 shown in FIG. 8 is gradually reduced from the central part to the end part thereof to produce a size difference g between the central and end parts. That is, a plane including the end face of the protrusion part 32b is formed not parallel with the bottom surface of the base plate 31. This size difference g is selected so as to allow for the amount of deformation caused by welding strain likely to be generated during welding of the connector and the beam 2. Numeral 33 refers to a groove formed on an end of the projection 32 facing the flange 2a of the beam 2 shown in FIG. 8.

FIG. 19 is a partially enlarged front view illustrating the state where the connector 3 is joined to the beam 2 in the second embodiment of this invention. Like parts are indicated by like numerals shown in FIGS. 8, 17 and 18. First, a spacer 8 of a thickness corresponding to the precalculated or preselected amount of welding strain is fixedly fitted at a predetermined location of the tack-welding jig 5 mounted on the rack 4, and the connector 3 is fixedly fitted at a predetermined location. In FIG. 19, the thickness of the spacer 8 is exaggerated for ease of understanding, but the actual thickness thereof is so minute as to allow for the amount of welding strain.

Next, the beam 2 is lifted by a crane (not shown) and placed on the rack 4 via a block 6. The end face of the beam 2 is matched with the end face of the projection 32 of the connector 3, and the connector 3 and the beam 2 are joined together by tack welding. Upon completion of joining operation, the beam to which the connector 3 is joined is removed from the rack to perform final welding. As is evident from FIG. 19, the end of the projection 32 of the connector 3 comes in close contact with the end of the beam 2, producing no gap in between. Joining operation is completed by filling the groove 33 with weld metal (not shown) during final welding. As described with reference to FIG. 9, even if deformation is caused by welding strain, the deformation acts on the connectors 3 shown in FIG. 19 in such a manner as to rotate the upper connector 3 clockwise and the lower connector 3 counterclockwise. That is, the bottom surfaces of the base plates 31 of the connectors 3 shown in FIG. 19, which have been formed beforehand to be concave toward the outside, eventually form a flat plane by the action of the deformation.

Figure 20:
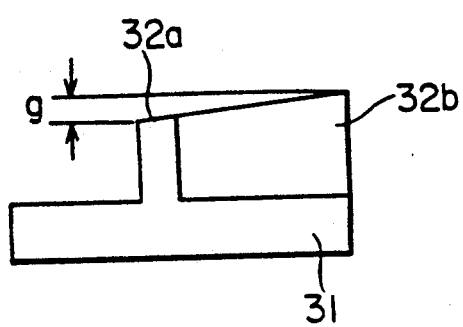
FIG. 20 is a front view illustrating a connector used in a third embodiment of this invention.

FIG. 20 is a front view illustrating a third embodiment of this invention. Like parts are indicated by like numerals shown in FIGS. 17 and 18. The connector 3 shown in FIG. 20 is such that the height of the projection part 32b from the base plate 31 is gradually increased from the central part to the end part thereof.

Figure 21:
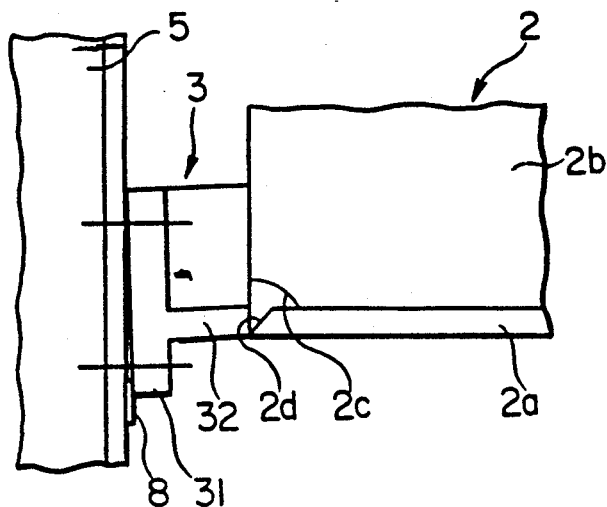
FIG. 21 is a partially enlarged front view illustrating the state where the connector and the beam are joined together in the third embodiment of this invention.

FIG. 21 is a partially enlarged front view illustrating the state of joining the connector 3 and the beam 2, corresponding to FIG. 19 above. In FIG. 21, numeral 2c refers to a scallop provided at an end of the web 2b at which the web 2b makes contact with the flange 2a of the beam 2. A groove 2d is provided in advance at an edge of the inside surface of the flange 2a. With this arrangement, tack welding and final welding are performed in much the same way as in the second embodiment. In this embodiment, since the deformation resulting from welding strain is in the direction opposite to that in the second embodiment, the bottom surface of the base plate 31 of the connector 3 is formed beforehand to be convex toward the outside. After final welding, the bottom surface of the base plate 31 of the connector 3, as a whole, forms a flat plane, as in the case of the second embodiment.

Figure 22:
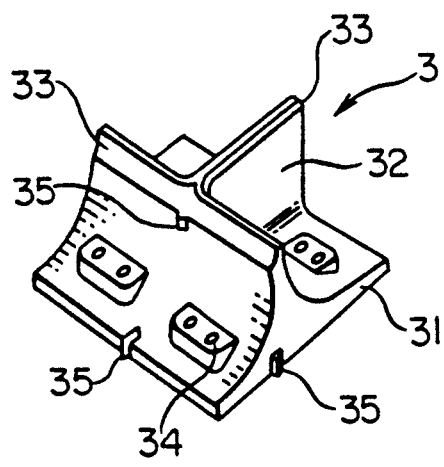
FIGS. 22 and 23 are front perspective view and a rear perspective view illustrating a connector used in a fourth embodiment of this invention.
Figure 23:
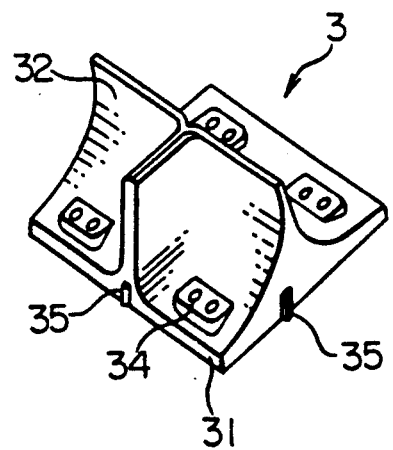

FIGS. 22 and 23 are a front perspective view and a rear perspective view of a connector used in a fourth embodiment of this invention. In both figures, the connector 3 is such that the projection 32 to which the flange and web of the beam are joined, and the base plate 31 making close contact with the column are formed into a substantially T-shape. Welding groove 33 is provided on the projection 32, and bolt holes 34 are provided on the base plate 31. Marks 35 are provided on the edges of the projection 32 and the base plate 31 corresponding to the center position of the projection 32. The marks 35 may be ridge-like projections, as shown in FIGS. 22 and 23, spotlike projections, grooves, recesses and any other desired shapes. When forming the connector 3 by a casting or forging means, the marks 35 may also be formed during the casting or forging operation.

With this arrangement, bolt holes 34 can be drilled on the base plate 31 merely by matching the marks 35 with the mark lines on the machine tool table, and thereby automatically positioning the center positions of the drill bits to the locations of the bolt holes 34 on the base plate 31. When welding the connector 3 to the above-mentioned beam 2, not only the positioning of the connector 3 to the tack-welding jig 5 shown in FIG. 19 but also the butting of the beam 2 on the surface board 4 against the connector 3 mounted on the tack-welding jig 5 can be facilitated by providing the marks 35.

In this embodiment, the marks 35 are provided on the base plate 31 and the projection 32. In the machine shop or the steel-frame fabricating plant, only one mark 35 may serve the purpose, and the location and number of marks may be determined as desired according to the shape and size of the connector 3.

Having the aforementioned construction and operation, this invention can achieve the following beneficial effects.

(1) Since the reverse side of a buildup portion is completely enclosed at the time of joining the connector and the beam by welding, no uneven reverse-side weld bead is generated. Thus, a sound buildup can be obtained as the flange and the protrusion are completely fused together.

(2) As welding volume and the number of turns of steelframe members having flanges can be substantially reduced, the fabricating manhours and time can be reduced. This leads to increased efficiency and effectiveness in joining operation.

(3) Splashes of molten metal generated from gouging and dangerous operations, such as the turning of heavy materials, can be substantially reduced. Thus, joining operation can be performed safely and easily.

(4) In welding the connector and the beam together, the projection constituting the connector and the end or web of the beam are brought in close contact, producing no gaps in between. This results in easy welding operation.

(5) Welding time and manhours can be substantially reduced due to reduced welding volume.

(6) As the amount of welding strains or deformation can be controlled, construction accuracy can be improved.

(7) Since the marking operation required for drilling bolt holes on the base plate of the connector, or on both the base plate and the projection, can be eliminated. As a result, manufacturing costs can be reduced.

(8) The marking operation on the connector for joining the connector to the beam can be eliminated. This leads to reduced construction costs.

What is claimed is:

1. A welding kit for connecting a beam having an H-shaped cross section including horizontal flanges having planar welding surfaces connected by a web, to a beam which allows for contraction of a weld bead comprising: a connectro piece having a base plate, a first extension extending from said base plate and being normal to said base plate and terminating at a first edge, said first edge having a mid point and being parallel to said base plate; a second extension extending from said base plate and being normal to said base plate and othogonal to said first extension, said second extension being on one side of said first extension and abutting said first extension at said mid point and defining a positioning side; said connector having a connector welding surface being opposite said positioning side and having a concave vertical cross section said cross section being constant along an axis which is parallel to said first edge, said concave cross section terminating at said first edge and extending toward said base plate and away from said positioning side; a backing strip having an abutment edge being fastened to the horizontal flanges said abutment edge being coplanar with the flanges welding surfaces, said connector piece first edge abutting said backing strip abutment edge, a vertical cross sectional gradient being defined between the flange welding surfaces and the connector welding surface, a shrinkage gradient determined from the vertical cross sectional gradient and the weld bead shrinkage characteristics, an angle of rotation of said connector piece about said first edge determined from said shrinkage gradient, said second edge and said base plate forming an angle therebetween being substantially equivalent to said angle rotation such that the connector piece is placed in a pre-weld position defined by said second edge abutting the beam web and said connector piece rotating by an angle of rotation to a post-weld position in which the base plate is an a vertical position.

2. A welding kit according to claim 1 further comprising:
a vertical jig having a spacer thereon, the connector piece held in said pre-weld position by said spacer abutting said base plate opposite said positioning said and said vertical jig abutting said connector piece opposite said connector piece welding surface.

3. A method of welding a beam having top and bottom horizontal flanges which have vertical welding faces connected by a vertical web to a column comprising the steps of: fabricating a connector piece having a base plate, an opposite abutting edge being parallel to the base plate, an opposite positioning edge being perpendicular to the abutting edge; determining the width and the thickness of the flange; forming a space in the connector piece which is as wide as the flange, as deep as the thickness of the flange and concave in cross section; securing a backing strip to the beam of flanges, the backing strip having a surface being coplanar with the flange welding faces; determining a shrinkage gradient of a weld being the shape of the space in the connector; determining an amount of angular rotation of the connector piece about the abutting edge based on the shrinkage gradient; forming the positioning edge of said connector piece to be at an acute angle between the backing plate and the positioning edge being substantially equal to the amount of angular rotation of the connector piece; abutting said abutment edge against the backing strip and positioning the positioning edge against the beam web; welding the connector piece to the beam by placing a weld bead in the space in the connector; allowing the bead to harden and shrink and thereby rotate the base plate to a vertical position.

* * * * *